S. B. FISHBURNE & I. H. BOND.
INTERCONNECTED CLUTCH AND BRAKE OPERATING MECHANISM.
APPLICATION FILED JUNE 3, 1909.
974,649.
Patented Nov. 1, 1910.
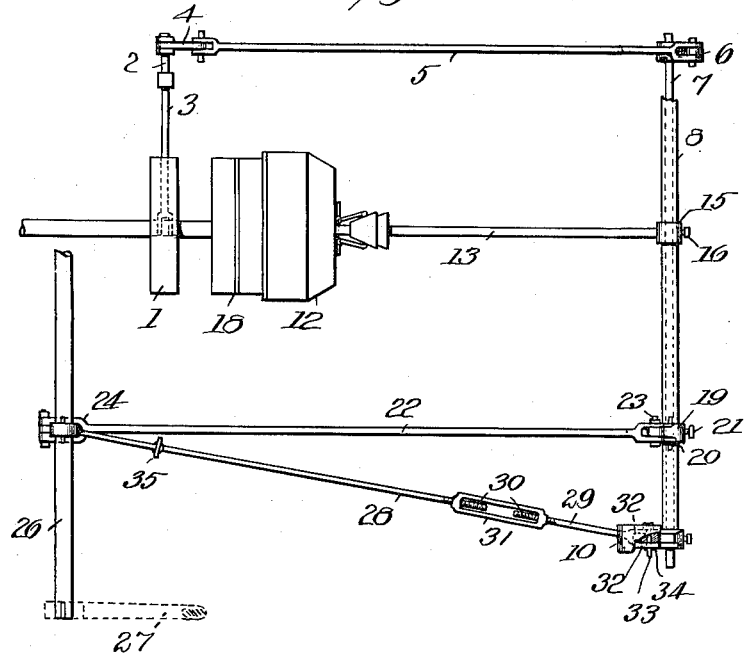
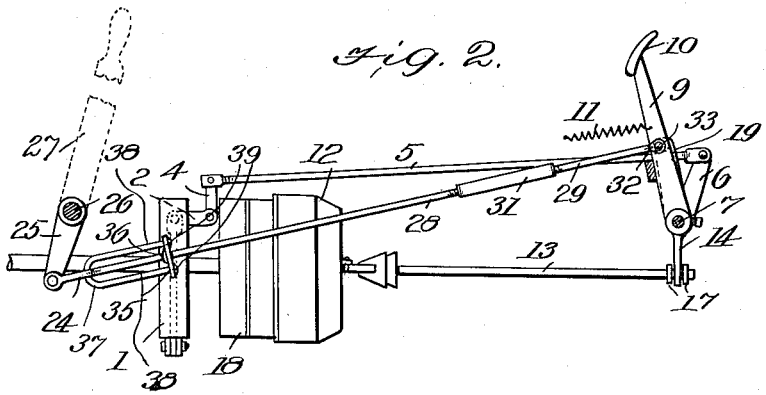

UNITED STATES PATENT OFFICE.

SKOTTOWE B. FISHBURNE AND ISRAEL H. BOND, OF COLUMBIA, SOUTH CAROLINA.

INTERCONNECTED CLUTCH AND BRAKE OPERATING MECHANISM.

974,649.  Specification of Letters Patent.  Patented Nov. 1, 1910.

Application filed June 3, 1909. Serial No. 499,869.

*To all whom it may concern:*

Be it known that we, SKOTTOWE B. FISH-BURNE and ISRAEL H. BOND, citizens of the United States, residing at Columbia, in the county of Richland and State of South Carolina, have made certain new and useful Improvements in Interconnected Clutch and Brake Operating Mechanism, of which the following is a specification.
Our invention is an improvement in automatic clutch releases for automobiles, and consists in certain novel constructions and combinations of parts hereinafter described and claimed.
The invention relates to mechanism for operating the high speed clutches of the transmission used in automobiles of certain types, and the object of the invention is to provide for disengaging the high speed clutch of the transmission operated by the lever of the engine brake at the same time that the brake is applied.

Referring to the drawings forming a part hereof: Figure 1 is a bottom plan view of the improvement, and Fig. 2 is a side view of the same.

In the present embodiment of the invention, the engine brake 1 is operated by means of an elbow lever, whose one arm 2 is connected by a link 3, with the engine brake and whose other arm 4 is connected by a link 5 with an arm 6, on a shaft 7, journaled in a sleeve 8, and the shaft is oscillated by means of a lever 9, secured thereto at one end and provided at the other with a foot plate 10. When the lever is moved forwardly, the engine brake is applied and the lever is retained in its rearward position by means of a spring 11.
The movable member 12 of the clutch is operated by a rod 13, whose other end passes through an opening in an arm 14, secured to the sleeve 8, by means of a bearing ring 15, engaging the sleeve and secured in place by a set screw 16. A lock nut 17 is threaded on to the rod on each side of the arm and it will be evident that when the sleeve is oscillated, the movable member 12 of the clutch will be connected to the fixed member 18 of the same, whereby to couple and uncouple the car with the motor.

An arm 19 is provided with a bearing ring 20, encircling the sleeve and secured in place by a set screw 21, and a link 22 is connected at one end to the arm by a bolt 23, and at the other is provided with a yoke 24, between whose arms is received an arm 25, extending laterally from the shaft 26, the said shaft being provided with a lever 27 for operating the same. When the shaft 27 is moved in the proper direction, the sleeve 8 will be oscillated and the movable member of the clutch will be moved toward and from the fixed member.

The above described mechanism is the usual and ordinary operating mechanism for the clutch and engine brake in automobiles of the character specified, and with its use when the brake is applied, it is first necessary to disengage the clutch, thus requiring two distinct movements, one the hand and one the foot. To obviate this disadvantage, the following mechanism is provided. A rod consisting of sections 28 and 29 is provided, the adjacent end of the sections being threaded as shown at 30, and engaged by a turn buckle 31. The outer end of the section 29 is provided with a yoke 32, whose arms extend on each side of the lever 9, and a pin 33 is passed through the arms and the lever and is engaged by a cotter pin 34, to retain it in place. The outer end of the section 28 passes through the center of a plate 35, and is headed as shown at 36. The body portion 37 of the yoke passes through the yoke 24 of the link 22, and the ends of the arms 38 of the yoke pass through the ends of the plate 35, and are headed on the opposite side as at 39, to prevent disengagement thereof.

With the above construction when the lever 9 is moved forwardly to apply the engine brake, the shaft 26 is oscillated and through the link 22, the sleeve 8 is also oscillated to release the clutch, so that by no possibility can the brake be applied without releasing the clutch. The clutch however may be operated independently of the brake since the section 28 of the link is slidable through the plate. The length of the link consisting of the sections 28 and 29 may be varied by means of the turn buckle 31.

We claim:

1. In combination a lever for operating an engine brake, a clutch operating mechanism, a shaft, said shaft having an arm, a rod connected at one end with the clutch operating mechanism and provided at the other with a yoke for engaging the arm, a rod detachably connecting the arm with the engine brake lever, said rod having at one end an eye for engaging an opening in the brake lever, a yoke whose body portion engages the yoke of the first named rod, a plate having a central and end openings, the arms of the yoke passing loosely through the end openings and being headed on the opposite side and the link passing through the central opening and being headed on the opposite side and a turn buckle interposed in the rod.

2. In combination a lever for operating an engine brake, and a clutch operating mechanism, a shaft, said shaft having an arm, a rod connected at one end with the clutch operating mechanism and provided at the other with a yoke for engaging the arm, a rod detachably connecting the arm with the engine brake lever, said rod having at one end an eye for engaging an opening in the brake lever, a yoke whose body portion engages the yoke of the first named rod, and a plate having a central and end openings, the arms of the yoke passing loosely through the end openings and being headed on the opposite side and the link passing through the central opening and being headed on the opposite side.

3. In combination a lever for operating an engine brake, and a clutch operating mechanism, a shaft, said shaft having an arm, a rod connected at one end with the clutch operating mechanism and provided at the other with a yoke for engaging the arm, a rod detachably connecting the arm with the engine brake lever, said rod having at one end means for engaging the brake lever, a yoke whose body portion engages the yoke of the first named rod, and a slidable connection between said yoke and said last named rod.

SKOTTOWE B. FISHBURNE.
ISRAEL H. BOND.

Witnesses:
ALMA DAVIS,
C. B. SIMMONS.